United States Patent
Pisseloup

(10) Patent No.: US 7,966,965 B2
(45) Date of Patent: Jun. 28, 2011

(54) AIRCRAFT GAS TURBINE OIL TANK WITH INDICATION OF FILLING LEVEL

(75) Inventor: Arnaud Pisseloup, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 208 days.

(21) Appl. No.: 12/379,381

(22) Filed: Feb. 19, 2009

(65) Prior Publication Data

US 2009/0218006 A1    Sep. 3, 2009

(30) Foreign Application Priority Data

Feb. 19, 2008  (DE) .......................... 10 2008 009 825

(51) Int. Cl.
*F01M 11/12* (2006.01)
*F01D 25/18* (2006.01)

(52) U.S. Cl. ...................................................... 116/227
(58) Field of Classification Search .................. 116/227; 137/551, 552, 558; 340/618
See application file for complete search history.

(56) References Cited

U.S. PATENT DOCUMENTS

| | | | |
|---|---|---|---|
| 4,440,022 A | 4/1984 | Masom | |
| 4,542,718 A * | 9/1985 | Hurner | 123/41.15 |
| 4,857,894 A * | 8/1989 | Dahl | 340/619 |
| 5,121,599 A * | 6/1992 | Snyder et al. | 60/779 |
| 5,349,994 A * | 9/1994 | Koeninger | 141/94 |
| 5,555,857 A | 9/1996 | Kanno | |
| 5,705,747 A * | 1/1998 | Bailey | 73/290 R |
| 5,708,424 A * | 1/1998 | Orlando et al. | 340/870.08 |
| 6,581,461 B1 * | 6/2003 | Diaz | 340/619 |
| 6,793,042 B2 * | 9/2004 | Brouillet | 184/6.11 |
| 6,964,278 B2 * | 11/2005 | Tschanz | 137/392 |
| 7,079,037 B2 * | 7/2006 | Ross et al. | 340/618 |
| 7,313,956 B1 * | 1/2008 | Murphy, Sr. | 73/313 |
| 7,508,315 B2 * | 3/2009 | Zimmermann | 340/663 |
| 2004/0246118 A1 * | 12/2004 | Tharman et al. | 340/450 |
| 2005/0056092 A1 * | 3/2005 | Kowalski | 73/313 |
| 2006/0000103 A1 | 1/2006 | Nicosia | |
| 2008/0093173 A1 * | 4/2008 | James et al. | 184/6.11 |

FOREIGN PATENT DOCUMENTS

| | | | |
|---|---|---|---|
| WO | WO 9535462 A1 * | 12/1995 | |
| WO | 0109570 | 2/2001 | |
| WO | 2004009962 | 1/2004 | |

OTHER PUBLICATIONS

European Search Report dated Jul. 1, 2009 from counterpart European patent application.

* cited by examiner

*Primary Examiner* — R. A. Smith
(74) *Attorney, Agent, or Firm* — Timothy J. Klima; Shuttleworth & Ingersoll, PLC

(57) ABSTRACT

An aircraft gas turbine oil tank 1 includes a casing, which is connected to a filler port, with an optical indicator 2 being associated with the oil tank 1, which includes at least one light emitter 3. This light emitter is associated with a specified filling level and emits an optical signal.

11 Claims, 2 Drawing Sheets

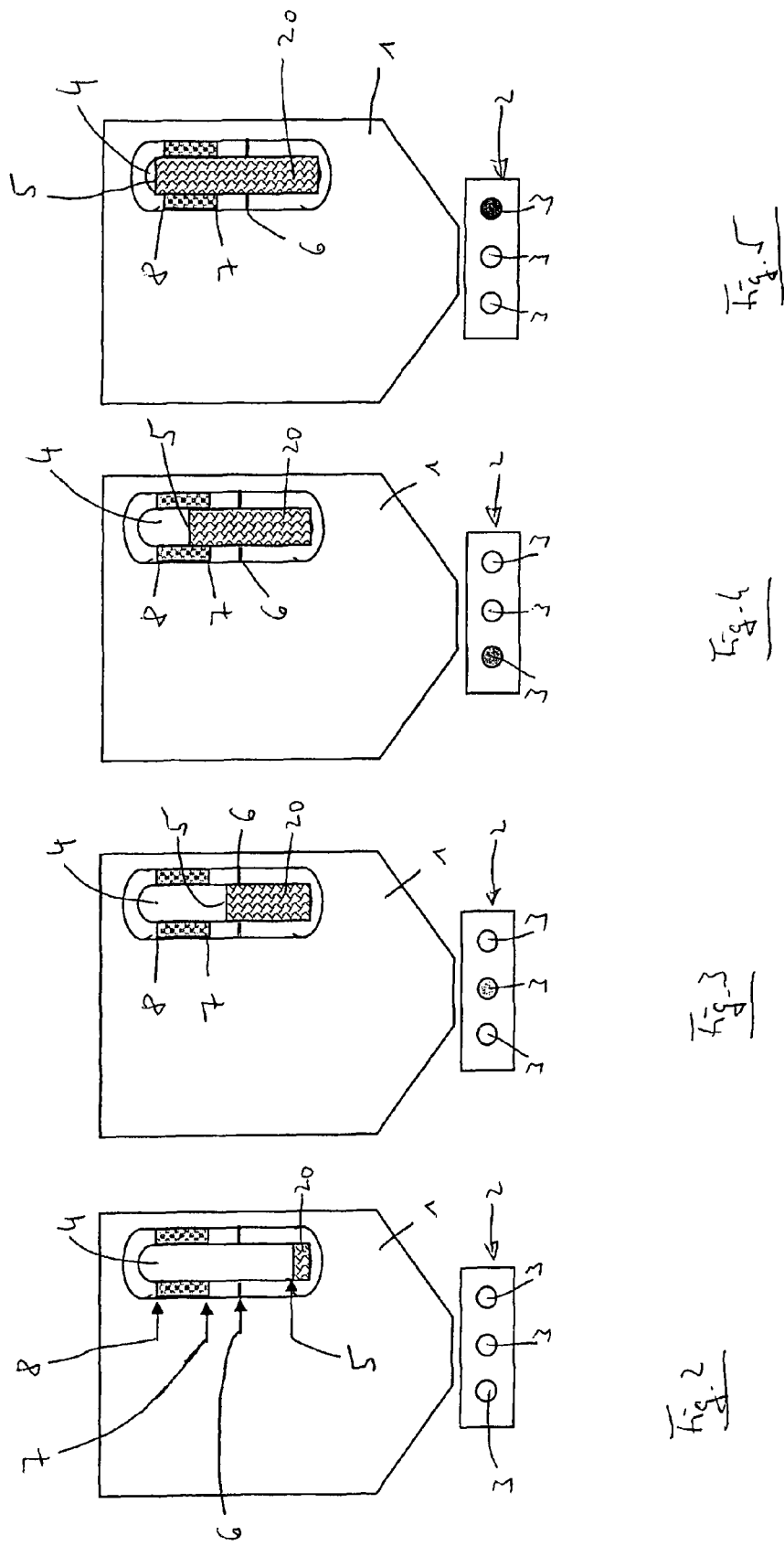

AIRCRAFT GAS TURBINE OIL TANK WITH INDICATION OF FILLING LEVEL

Figure 1:
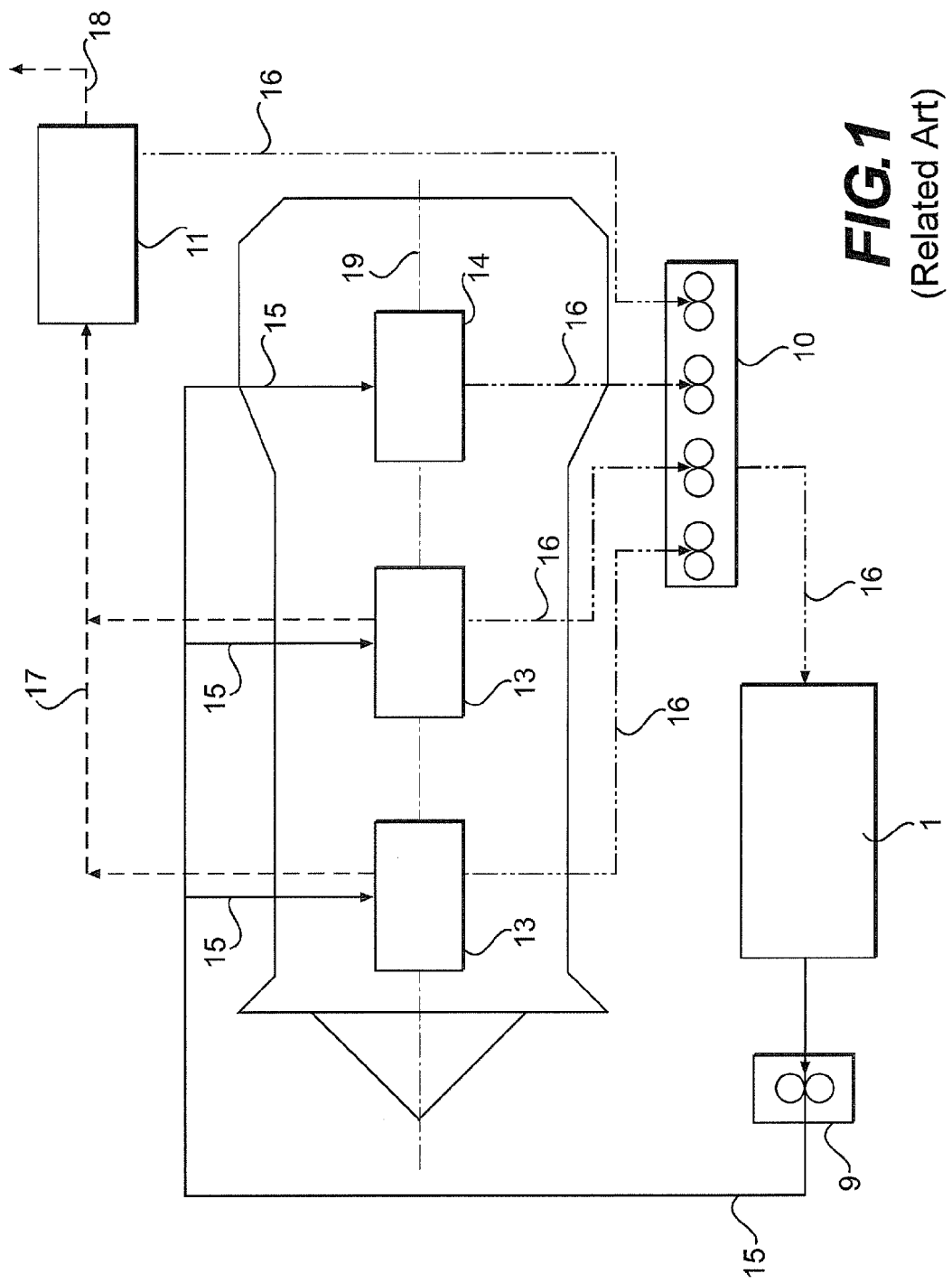

This application claims priority to German Patent Application DE102008009825.6 filed Feb. 19, 2008, the entirety of which is incorporated by reference herein.

The present invention relates to an aircraft gas turbine with an oil tank having a casing provided with or connected to an oil filler port.

With aircraft gas turbines or other aircraft engines, it is known from the state of the art to indicate and read the oil tank filling level either in the cockpit, with a sensor and a transmission line here being required, or to read the oil level directly on the oil tank by means of an inspection glass or a sight glass.

Various procedures apply for refilling oil into an oil tank of an aircraft.

The state of the art shows separate oil refilling systems which enable oil to be refilled by pressurization, with a corresponding switch or button in the cockpit being actuated. The oil content or filling level is then transmitted to a cockpit indicator. This is accomplished by a transmitter installed in the oil tank. Such a remote filling level system can also be used by ground engineers equipped with special equipment for filling or refilling pressurized oil into the oil tank.

Especially with older aircraft, it is known from the state of the art to fill up oil manually through a filler neck or similar device using gravity. Filling is controlled by a sight glass which usually is provided with various filling level marks. By reading the sight glass, the operating personnel can determine the quantity of oil still required to top up the oil tank to the desired maximum level.

The known procedures for filling or refilling an oil tank manually by gravity or by pressurization lack accuracy. Sometimes, appropriate performance of the filling operation is impeded by the fact that the oil tank is badly accessible and/or the sight glass is inconveniently arranged or badly readable. Moreover, inspection is complicated or made impossible by adverse lighting conditions.

It is further disadvantageous that the color of the oil changes by aging, contamination or other influences. The color of the sight glass may also change by aging. All these factors impair reading accuracy. Even the use of colored light sources (violet light) will not remedy this problem. In some cases, the operating personnel will require a hand lamp or another light source to perform inspection. In even more adverse cases, the sight glass must be watched via a mirror when the oil tank is filled.

It is a broad aspect of the present invention to provide a reading device, which avoids the disadvantages of the state of the art and enables exact filling of an oil tank in an aircraft.

In accordance with the present invention, an optical indicating device is therefore associated with the oil tank which includes at least one light emitter. This light emitter is associated with a specified filling level and then emits an optical signal.

The active design and the emission of an optical signal enable the actual filling level and/or the reaching of a desired filling level to be particularly simply displayed and indicated to the operating personnel.

In a particularly favorable embodiment of the present invention, the light emitter is provided as light-emitting diode (LED). This form is very energy-saving and cost-effective and is characterized by long service life and a high degree of reliability.

In accordance with the present invention, it is therefore advantageous if the LED is installed in a sight glass of an oil tank or directly associated to the latter or provided at the bottom of the oil tank or at another place which is well visible to the operating personnel during the filling operation.

In accordance with the present invention, the LED will light up when the respective filling level (for example the maximum filling level) is reached. Thus, the engineer/operating personnel is informed that no further quantity of oil needs to be added.

In an advantageous development of the present invention, the LED can be supplied with power provided by the oil tank quantity indicator transmitter. This transmitter is required to indicate oil level information in the cockpit. Accordingly, no extra power supply is required for the LED. If the aircraft gas turbine or engine is at rest, power supply can be maintained by a battery or a capacitor, these storing the required power during operation of the turbine or engine and making it available for the oil filling operation when the turbine or the engine is at rest.

A capacitor, if used, can be dimensioned such that it supplies power for a given period of time (for example 30 minutes) after shutdown of the turbine or aircraft engine, respectively. This period of time is sufficient for the engineer or operating personnel to check the oil filling level and refill oil.

In accordance with the present invention, the LED's need not have direct contact with the oil in the tank. Thus, the risk of oxidation of the LED connections is minimized. The LED can be positioned on the outside of the tank or at another suitable place and provided with an electrical bridge which determines, and electrically evaluates, the oil level in the tank via a change in resistance. This enables power to be transmitted to the LED. In respect of different filling levels, it is here favorable to make provision for the calibration of the system for each individual oil tank to improve accuracy and cater for variations in wall thickness and the manufacturing method of the oil tank.

The LED may also be integrated in the sight glass so that the connections of the LED directly extend into the oil tank, thereby enabling it to be determined when the respective oil level touches the connecting wires of the LED. This arrangement enables the LED to be precisely actuated to indicate the oil level to the engineer.

In the event of failure of the LED or the associated circuit, it is particularly advantageous if a second LED—as safety LED—is provided controlling at least the maximum filling level of the oil tank. This safety LED can have different color to preclude incorrect reading.

It is also particularly favorable to provide a third LED indicating to the engineer or the operating personnel when a certain level, which is below the maximum filling level by a specified value, is reached. This can be one US pint less than the maximum filling level, for example. A warning is thus provided indicating to the engineer or operating personnel that the maximum filling level is almost reached and the refilling operation has to be stopped soon. This arrangement prevents a too large quantity of oil from being added, which would subsequently have to be removed or would escape through exit openings.

Therefore, the present invention is advantageous in that filling of oil into the oil tank is facilitated and that the oil level is accurately readable by the engineer/operating personnel. No ancillary equipment, such as extra lamps, mirrors or similar, is required for this purpose.

The present invention accordingly provides for a reduction of the refilling time. The use of additional special equipment is dispensed with, in particular when oil tanks are located at the bottom or are badly accessible.

Furthermore, according to the present invention, the oil volume is optimally utilized since oil overfill is avoided.

The present invention is more fully described in light of the accompanying drawings showing a preferred embodiment. In the drawings, FIG. 1 is a schematic overall representation of an oil system of an aircraft gas turbine, and FIGS. 2 to 5 are representations of an embodiment of the present invention in different operating states.

FIG. 1 shows, in schematic view, an aircraft gas turbine with a machine axis 19 on which two vented bearing chambers 13 and one unvented bearing chamber 14 are arranged. Via a feed line 15, an oil pump 9 supplies the bearing chambers 13 and 14 with oil from an oil tank 1. The oil leaves the bearing chambers 13 and 14 via scavenge lines 16 leading to a scavenge pump unit 10. Via the scavenge line 16, the oil to be returned reaches the oil tank 1.

FIG. 1 further shows vent lines 17 leading from the bearing chambers 13 and 14 to a breather 11 connected to an external vent line 18 and an oil scavenge line 16.

FIGS. 2 to 4 show, in schematic representation, an example of an oil tank 1. It includes a sight glass 4 which is provided with various filling marks, namely a high filling level 8, a low filling level 7 and a filling level 6 which is below the low filling level 7 by a given quantity.

Reference numeral 5 indicates the actual filling level associated with a given quantity of oil 20.

In accordance with the present invention, an optical indicator 2 is provided, which in the example shown, has three LED's.

FIG. 2 shows a state in which the LED's 3 give no optical indication because the oil level is too low and refilling of oil is required.

In FIG. 3, the center LED 3 has yellow color. Lighting up of this LED indicates that the oil level is still below the low filling level 7, but already within a range (above the filling level 6) set for refilling a given quantity, for example one US quart.

FIG. 4 shows a state in which the left-hand LED lights up. This LED has green color and indicates that the oil level is above the low filling level 7 and below the high filling level 8.

FIG. 5 shows a state in which the right-hand LED lights up, which has red color. The oil level is above the high filling level 8. This indicates overfilling.

The present invention is not limited to the embodiment here shown. It is apparent that a plurality of modifications may be incorporated in the present invention, without departing from the inventive concept.

LIST OF REFERENCE NUMERALS

1 Oil tank
2 Optical indicator
3 LED
4 Sight glass
5 Actual filling level
6 Filling level, one quantity below low filling level
7 Low filling level
8 High filling level
9 Oil pump
10 Scavenge pump unit
11 Breather
13 Vented bearing chamber
14 Unvented bearing chamber
15 Feed line
16 Scavenge line
17 Vent line
18 External vent line
19 Machine axis
20 Oil

What is claimed is:

1. An aircraft gas turbine oil tank, comprising:
a casing, which is connected to a filler port;
an optical indicator associated with the oil tank, which includes at least first, second and third powered light emitters, each for emitting an optical signal at a specified oil tank filling level;
the first powered light emitter emitting an optical signal when an actual oil level in the oil tank is between, inclusive, a low acceptable filling level and a high acceptable filling level of the tank;
the second powered light emitter emitting an optical signal when the actual oil level in the oil tank is above the high acceptable filling level of the tank;
the third powered light emitter emitting an optical signal when the actual oil level in the oil tank is below the low acceptable level but above a low quantity filling level at which a given quantity of oil added to the oil tank will bring the actual oil level in the oil tank to between, inclusive, the low acceptable filling level and the high acceptable filling level of the tank.

2. The aircraft gas turbine oil tank of claim 1, wherein each light emitter is an LED.

3. The aircraft gas turbine oil tank of claim 1, and further comprising a power supply for the light emitters.

4. The aircraft gas turbine oil tank of claim 3, wherein the power supply is a capacitor.

5. The aircraft gas turbine oil tank of claim 1, wherein the light emitters each emit a different color.

6. The aircraft gas turbine oil tank of claim 1, wherein the optical indicator is positioned on the oil tank.

7. The aircraft gas turbine oil tank of claim 1, wherein the optical indicator is positioned separately from the oil tank.

8. The aircraft gas turbine oil tank of claim 1, wherein the optical indicator is coupled with a sight glass.

9. The aircraft gas turbine oil tank of claim 1, wherein when one of the powered light emitters is emitting its optical signal, the other powered light emitters are prevented from emitting optical signals, so that only a single powered light emitter is emitting an optical signal at a given time.

10. The aircraft gas turbine oil tank of claim 9, wherein all of the first, second and third powered light emitters are prevented from emitting an optical signal when the actual oil level in the oil tank is below the low quantity filling level.

11. The aircraft gas turbine oil tank of claim 1, wherein all of the first, second and third powered light emitters are prevented from emitting an optical signal when the actual oil level in the oil tank is below the low quantity filling level.

* * * * *